United States Patent
Sugawara (10) Patent No.: US 9,648,250 B2
(45) Date of Patent: May 9, 2017

(54) IMAGE PICKUP APPARATUS AND METHOD OF CONTROLLING THE SAME

(71) Applicant: CANON KABUSHIKI KAISHA, Tokyo (JP)

(72) Inventor: Atsushi Sugawara, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 14/808,774

(22) Filed: Jul. 24, 2015

(65) Prior Publication Data

US 2016/0028934 A1 Jan. 28, 2016

(30) Foreign Application Priority Data

Jul. 28, 2014 (JP) .................. 2014-152910

(51) Int. Cl.
 *H04N 9/73* (2006.01)
 *H04N 5/228* (2006.01)
 *H04N 5/235* (2006.01)
 *H04N 5/232* (2006.01)

(52) U.S. Cl.
 CPC ......... *H04N 5/2357* (2013.01); *H04N 5/2351* (2013.01); *H04N 5/2353* (2013.01); *H04N 5/23219* (2013.01)

(58) Field of Classification Search
 CPC .... H04N 5/235; H04N 5/2351; H04N 5/2353; H04N 5/2357; H04N 5/23219; H04N 5/63; H04N 5/232
 See application file for complete search history.

(56) References Cited

U.S. PATENT DOCUMENTS

2006/0152598 A1* 7/2006 Kawarada .......... H04N 5/23248
 348/226.1
2013/0271623 A1* 10/2013 Jo .................. H04N 5/2357
 348/226.1

FOREIGN PATENT DOCUMENTS

JP 06-209427 A 7/1994
JP 2008-199144 A 8/2008

* cited by examiner

*Primary Examiner* — Sinh Tran
*Assistant Examiner* — Selam Gebriel
(74) *Attorney, Agent, or Firm* — Cowan, Liebowitz & Latman, P.C.

(57) ABSTRACT

A mechanism which makes it possible to obtain high-quality images in continuous photographing by reducing the influence of flicker while suppressing reduction of frame speed. An image pickup apparatus includes an image pickup device and an exposure unit configured to perform exposure of the image pickup device in response to a photographing instruction. An AE sensor detects peak timing of flicker. A camera CPU switches between peak synchronous exposure in which exposure operation is performed by making the same synchronous with the peak timing of flicker and normal exposure in which exposure operation is performed without making the same synchronous with the peak timing of flicker. The camera CPU corrects a photographed image obtained by the normal exposure. The camera CPU switches between the peak synchronous exposure and the normal exposure, based on the detected peak timing of flicker.

14 Claims, 9 Drawing Sheets

IMAGE PICKUP APPARATUS AND METHOD OF CONTROLLING THE SAME

BACKGROUND OF THE INVENTION

Field of the Invention

The present invention relates to an image pickup apparatus, such as a digital camera, and more particularly to a technique for correcting exposure unevenness due to flicker (i.e. change in ambient light which occurs during photographing).

Description of the Related Art

In many image pickup apparatuses, such as digital cameras, with a recent increase in the ISO sensitivity, it has become possible to perform high-speed shutter photographing even under an artificial light source which causes flicker. High-speed shutter photographing is advantageous in that a photograph without image blur can be obtained e.g. in photographing of an indoor-sports scene. However, in high-speed shutter photographing under a flicker light source, frame-by-frame variation in image exposure or color temperature can occur due to the influence of flicker.

To cope with the above-mentioned problem, there has been proposed a technique in which flicker is detected and then exposure is performed in timing corresponding to the peak position of the flicker, where change in brightness is smallest, so as to reduce the influence of the flicker (see Japanese Patent Laid-Open Publication No. H06-209427).

Further, there has been proposed a technique in which after images are sequentially picked up in predetermined timing, signal levels of the respective images are determined, and an image of a reference signal level is determined based on a result of the determination, whereby the signal levels of the respective images are corrected according to a ratio between the signal level of the determined reference image and that of each of the other images (see Japanese Patent Laid-Open Publication No. 2008-199144). According to this proposal, when the ratio exceeds a predetermined range, only the reference image is output.

However, the technique proposed in Japanese Patent Laid-Open Publication No. H06-209427 has a problem that in still image photographing, when exposure is performed in timing corresponding to a flicker peak position, a release time lag occurs depending on the flicker timing. Accordingly, in still image continuous photographing, it is required to await the peak position of the flicker for each frame and then release a shutter, and therefore a time period taken to complete one-frame exposure can be increased depending on flicker timing, which can lead to reduction of frame speed. Further, in the case of Japanese Patent Laid-Open Publication No. 2008-199144, since the signal level of each image is corrected by multiplying the signal level by a gain, noise can be generated in the image, causing degradation of image quality.

SUMMARY OF THE INVENTION

The invention provides a mechanism which makes it possible to obtain high-quality images in continuous photographing by reducing the influence of flicker while suppressing reduction of frame speed.

In a first aspect of the invention, there is provided an image pickup apparatus capable of performing continuous photographing with a specified frame speed, comprising an image pickup device, an exposure unit configured to perform exposure of the image pickup device in response to a photographing instruction, a detection unit configured to detect peak timing of flicker, a switching unit configured to switch between first exposure in which the exposure unit performs an exposure operation by making the exposure operation synchronous with the peak timing of flicker detected by the detection unit and second exposure in which the exposure unit performs an exposure operation without making the exposure operation synchronous with the peak timing of flicker detected by the detection unit, and a correction unit configured to correct a photographed image obtained by the second exposure, wherein the switching unit switches between the first exposure and the second exposure, based on the peak timing of flicker detected by the detection unit.

In a second aspect of the invention, there is provided an image pickup apparatus capable of performing continuous photographing with a specified frame speed, comprising an image pickup device, an exposure unit configured to perform exposure of the image pickup device in response to a photographing instruction, a detection unit configured to detect peak timing of flicker, a switching unit configured to switch between first exposure in which the exposure unit performs an exposure operation by making the exposure operation synchronous with the peak timing of flicker detected by the detection unit and second exposure in which the exposure unit performs an exposure operation without making the exposure operation synchronous with the peak timing of flicker detected by the detection unit, and a correction unit configured to correct a photographed image obtained by the second exposure, wherein the switching unit switches to the first exposure in a case where the specified frame speed is not higher than a predetermined speed, and switches to the second exposure in a case where the specified frame speed is higher than the predetermined speed.

In a third aspect of the invention, there is provided an image pickup apparatus comprising an image pickup device, a calculation unit configured to calculate a light amount change characteristic of light from an object, a control unit configured to control exposure of the image pickup device, and a correction unit configured to perform brightness correction on image data obtained by causing exposure of the image pickup device, wherein the control unit switches, based on the light amount change characteristic calculated by the calculation unit, between first exposure control in which the exposure of the image pickup device is caused while considering timing at which the amount of light from the object satisfies predetermined conditions, and second exposure control in which the exposure of the image pickup device is caused without considering the timing at which the amount of light from the object satisfies the predetermined conditions, and wherein the correction unit performs the brightness correction on image data obtained by the control unit performing the second exposure control and causing the exposure of the image pickup device.

In a fourth aspect of the invention, there is provided a method of controlling an image pickup apparatus including an image pickup device and an exposure unit configured to perform exposure of the image pickup device in response to a photographing instruction, the image pickup apparatus being capable of performing continuous photographing with a specified frame speed, comprising detecting peak timing of flicker, switching between first exposure in which the exposure unit performs an exposure operation by making the exposure operation synchronous with the peak timing of flicker detected by said detecting and second exposure in which the exposure unit performs an exposure operation without making the exposure operation synchronous with the peak timing of flicker detected by said detecting, correcting a photographed image obtained by the second exposure, and switching between the first exposure and the second exposure, based on the peak timing of flicker detected by said detecting.

In a fifth aspect of the invention, there is provided a method of controlling an image pickup apparatus including an image pickup device and an exposure unit configured to perform exposure of the image pickup device in response to a photographing instruction, the image pickup apparatus being capable of performing continuous photographing with a specified frame speed, comprising detecting peak timing of flicker, switching between first exposure in which the exposure unit performs an exposure operation by making the exposure operation synchronous with the peak timing of flicker detected by said detecting and second exposure in which the exposure unit performs an exposure operation without making the exposure operation synchronous with the peak timing of flicker detected by said detecting, correcting a photographed image obtained by the second exposure, and switching to the first exposure in a case where the specified frame speed is not higher than a predetermined speed, and switching to the second exposure in a case where the specified frame speed is higher than the predetermined speed.

In a sixth aspect of the invention, there is provided a method of controlling an image pickup apparatus, comprising calculating a light amount change characteristic of light from an object, controlling exposure of an image pickup device, performing brightness correction on image data obtained by causing exposure of the image pickup device, switching, based on the calculated light amount change characteristic, between first exposure control in which the exposure of the image pickup device is caused while considering timing at which the amount of light from the object satisfies predetermined conditions, and second exposure control in which the exposure of the image pickup device is caused without considering the timing at which the amount of light from the object satisfies the predetermined conditions, and performing the brightness correction on image data obtained by performing the second exposure control and causing the exposure of the image pickup device.

According to the invention, it is possible to obtain high-quality images in continuous photographing by reducing the influence of flicker while suppressing reduction of frame speed.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1:
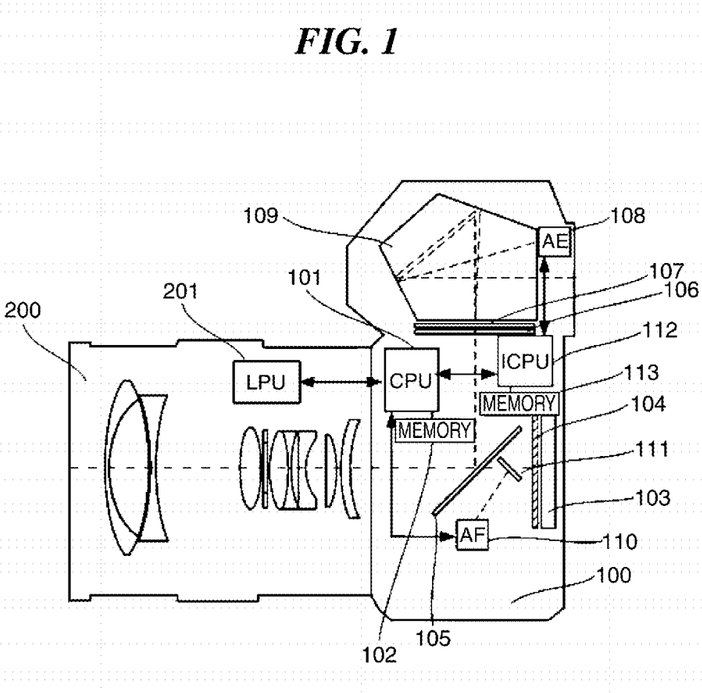
FIG. 1 is a schematic view of a digital single-lens reflex camera as an image pickup apparatus according to an embodiment of the invention.

FIG. 1 is a schematic view of a digital single-lens reflex camera as an image pickup apparatus according to an embodiment of the invention.

As shown in FIG. 1, the digital single-lens reflex camera of the present embodiment has a camera body 100 and an exchangeable lens barrel 200 which can be mounted on and removed from the camera body 100.

The camera body 100 has a camera CPU 101 that controls the overall operation of the camera, and a memory 102 including a RAM and a ROM is connected to the camera CPU 101. At the time of viewfinder observation, a main mirror 105 and a sub mirror 111 enter a photographic optical path and guide an object light flux having passed through the lens barrel 200 to a focus board 106, and at the time of photographing, the main mirror 105 and the sub mirror 111 retreat from the photographic optical path and guide the object light flux to an image pickup device 103. The main mirror 105 is formed as a half mirror, and the sub mirror 111 reflects part of an object light flux having passed through the main mirror 105 and guides the reflected light flux to an AF unit 110.

A penta roof prism 109 converts an image of the object light flux formed on the focus board 106 to an erect normal image. The converted object image is not only guided to an AE sensor 108, but also observed through an optical viewfinder. A display device 107 e.g. of polymer network (PN) liquid crystal displays an AF range-finding frame to show an in-focus position when a user looks into the optical viewfinder.

The image pickup device 103 is implemented e.g. by a CCD sensor or a COMS sensor, and includes an infrared cut filter and a low pass filter. At the time of photographing, the image pickup device 103 performs photoelectric conversion of the object image of the object light flux having passed through the lens barrel 200 to an image signal, and outputs the image signal. A shutter 104 in a non-photographing state blocks light to the image pickup device 103, and when in a photographing state, opens to guide an object light to the image pickup device 103.

The AE sensor 108 performs not only photometry but also scene recognition, such as face detection, and flicker detection, by using an image pickup device, such as a CCD sensor or a COMS sensor. Although in the present embodiment, the AE sensor 108 is used as a unit for detecting flicker, the image pickup device 103 may be used as a flicker detection unit.

An ICPU 112 serves as a CPU that controls the driving of the AE sensor 108 and performs image processing and computation. The ICPU 112 performs not only computation for face detection, computation for tracking an object, and computation for photometry, but also detection of flicker frequency and flicker peak timing, described hereinafter, and so forth. The ICPU 112 is connected to a memory 113 including a RAM and a ROM. Although in the present embodiment, the ICPU 112 dedicated to the AE sensor 108 is used, all processing performed by the ICPU 112 may be performed by the camera CPU 101. An LPU 201 is a CPU provided in the lens barrel 200. The LPU 201 sends information on a distance to an object and the like to the camera CPU 101.

Figure 2A:
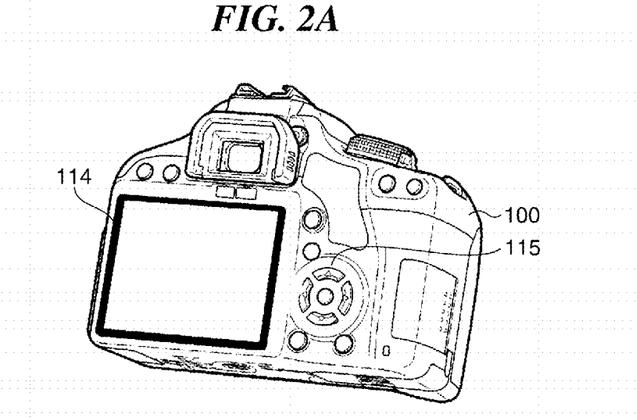
FIG. 2A is a perspective view of a camera body of the digital single-lens reflex camera in FIG. 1, as viewed from the rear.
Figure 2B:
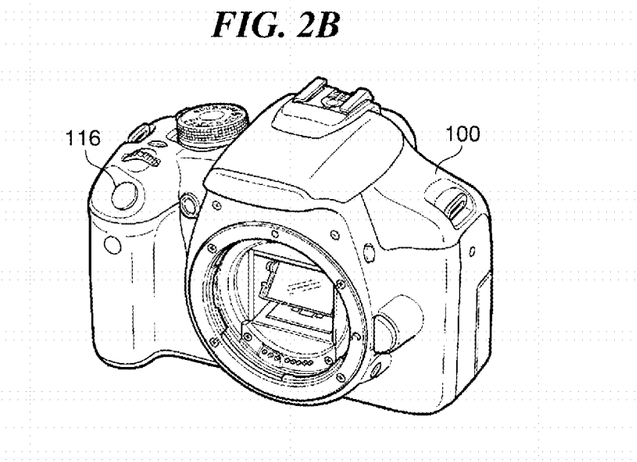
FIG. 2B is a perspective view of the camera body, as viewed from the front.

FIG. 2A is a perspective view of the camera body 100, as viewed from the rear, and FIG. 2B is a perspective view of the camera body 100, as viewed from the front.

As shown in FIG. 2A, on the rear side of the camera body 100, there is disposed a display device 114 formed by an LCD or the like, and on the right side, as viewed in FIG. 2A, of the display device 114, there is disposed an operation button group 115 for use in various operations. The display device 114 displays a live view video image that is being picked up, a reproduced photographed image, a menu setting screen, and various kinds of information. The operation button group 115 is comprised of various buttons that a user uses for operations including menu option selection, menu option setting, and menu option cancellation, zooming operation, etc.

Further, as shown in FIG. 2B, a release button 116 is disposed on the upper left corner, as viewed from the front of the camera body 100. When the release button 116 is half pressed, a release switch SW1, not shown, is turned on, and a photographing preparation operation including AF (auto focus) and AE (auto exposure) is started, and when the release button 116 is fully pressed, a release switch SW2, not shown, is turned on, and a photographing instruction is issued, whereby a photographing operation is started.

Figure 3:
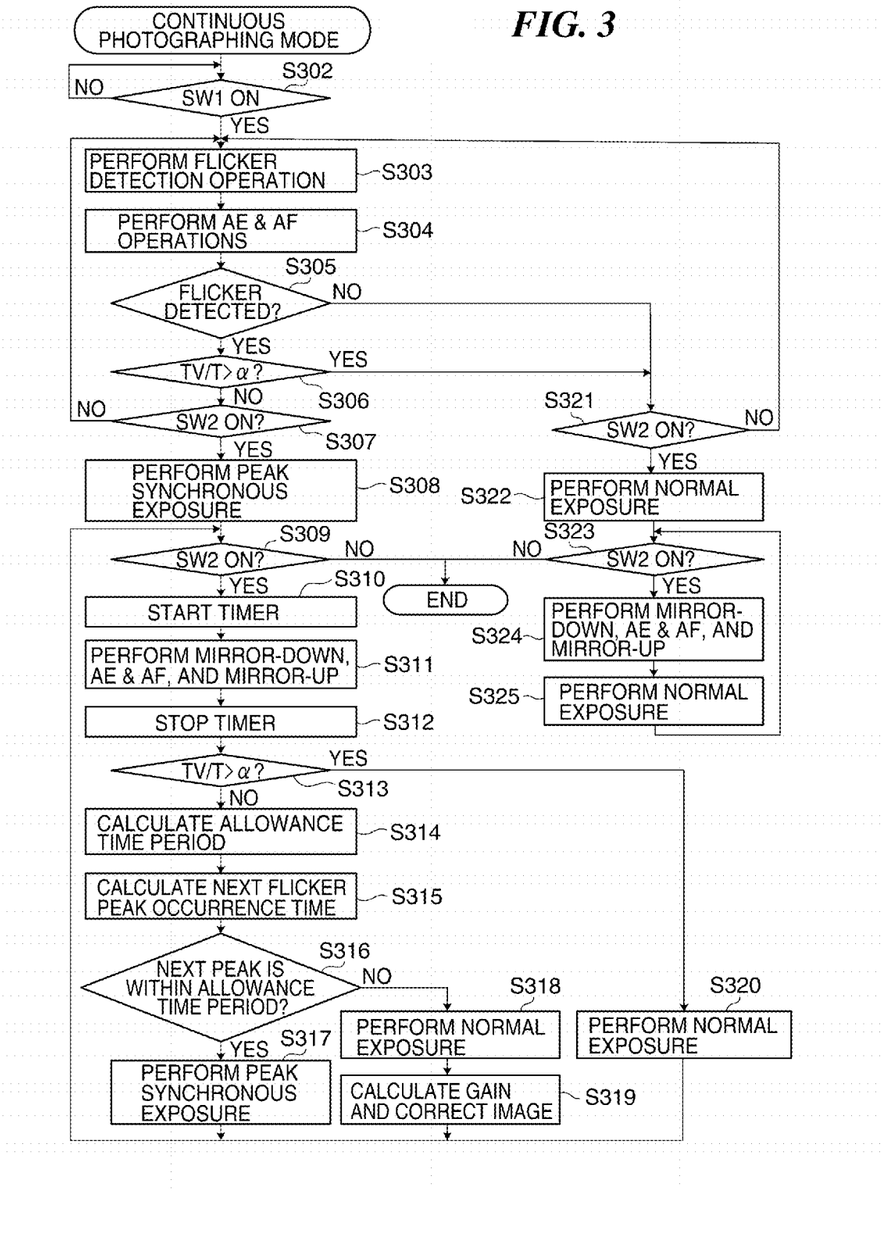
FIG. 3 is a flowchart of a photographing process in a continuous photographing mode, which is performed by the digital single-lens reflex camera.

Next, a description will be given, with reference to FIGS. 3 to 9, of a photographing process in a continuous photographing mode, which is performed by the digital single-lens reflex camera configured as described above. FIG. 3 is a flowchart of the photographing process performed by the digital single-lens reflex camera. Note that the photographing process in FIG. 3 is performed under the control of the camera CPU 101 which loads an associated program stored e.g. in the ROM of the memory 113 into the RAM, and executes the program.

In the continuous photographing mode, when the release switch SW1 is turned on (YES to a step S302), the camera CPU 101 proceeds to a step S303.

In the step S303, the ICPU 112 is caused to perform flicker detection processing, and generates a light emission period of detected flicker and a peak synchronization signal. Specifically, the ICPU 112 performs accumulation over an accumulation time period of 1.66 ms, consecutive twelve times, by the AE sensor 108.

Figure 4:
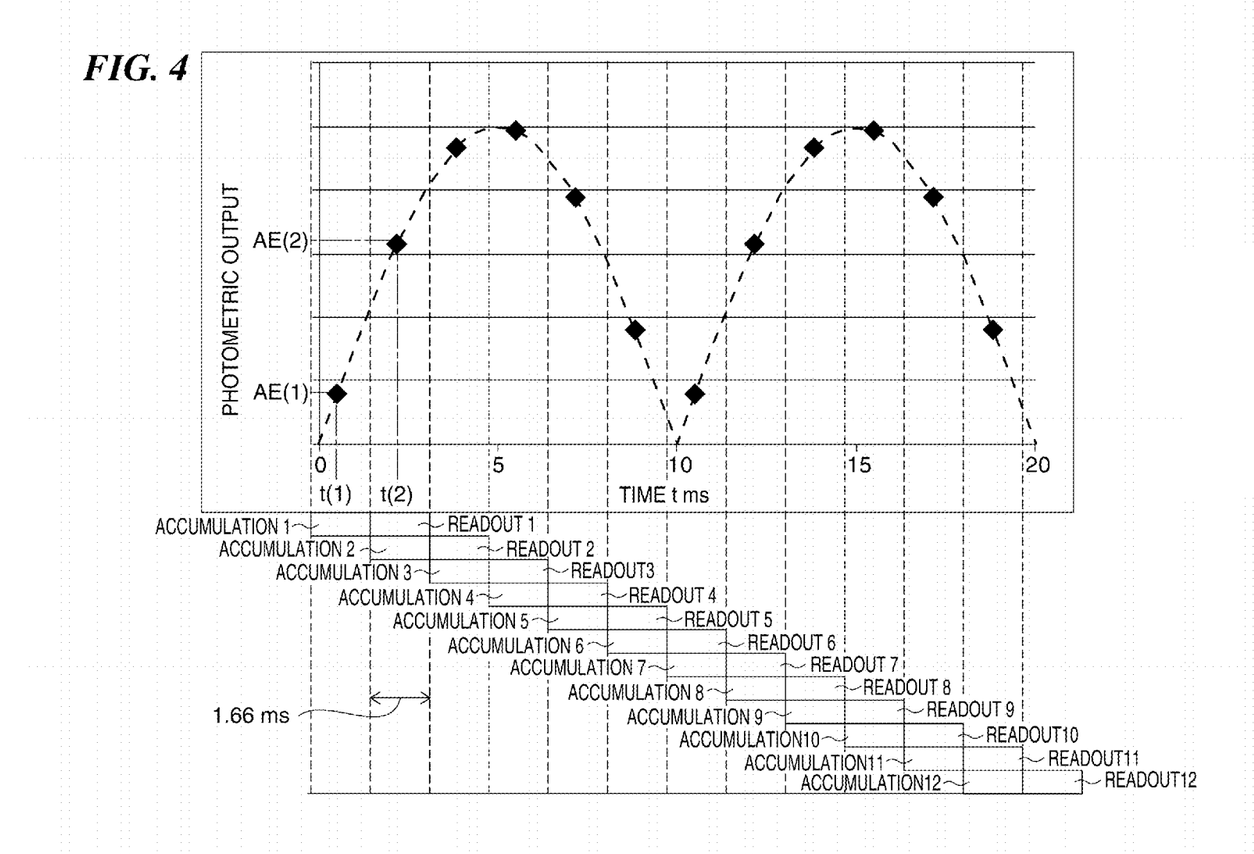
FIG. 4 is a graph showing the relationship between accumulation control and output photometric values in a case where there is flicker when the frequency of a commercial power supply is 50 Hz.

FIG. 4 is a graph showing the relationship between accumulation control and output photometric values in a case where there is flicker when the frequency of a commercial power supply is 50 Hz. In FIG. 4, n-th accumulation is represented by "accumulation n", readout of the result of the accumulation n by "readout n", and a photometric value obtained from the result of the readout n by "AE(n)". Further, acquisition time of each photometric value is represented by a central value in an accumulation period because accumulation is performed over a limited time period, and a time when a photometric value AE(n) is obtained is represented by "t(n)". Note that although only plots corresponding to n=1 and n=2 are illustrated as such in FIG. 4, the same applies to plots corresponding to n=3 to 12.

In a case where the frequency of the commercial power supply is 50 Hz, the light emission period of the flicker is 10 ms, and hence, in this case, the number of accumulation time periods can be calculated as 10/1.66≈6, which means that it is possible to obtain the same photometric value every six accumulation time periods irrespective of accumulation timing, as shown in FIG. 4. In short, the relationship of AE(n)=AE (n+6) holds.

Figure 5:
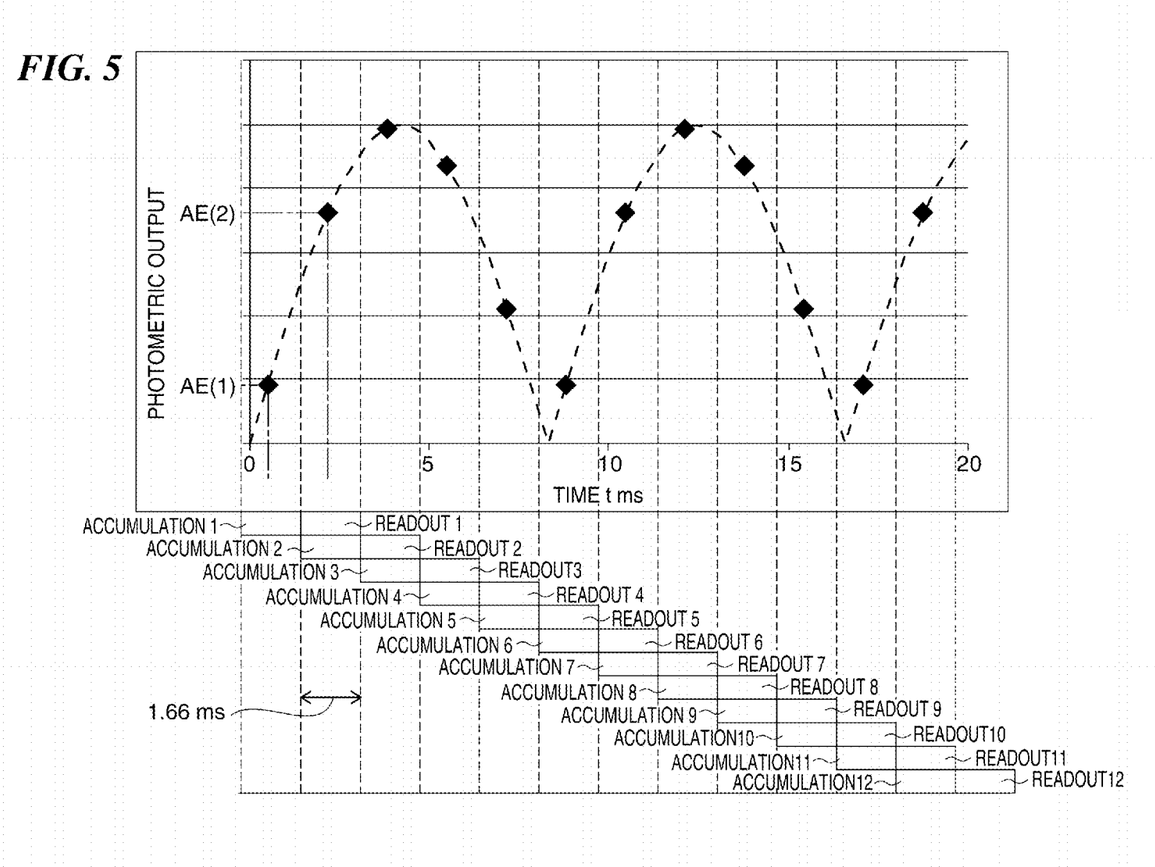
FIG. 5 is a graph showing the relationship between accumulation control and output photometric values in a case where there is flicker when the frequency of a commercial power supply is 60 Hz.

Similarly, in a case where the frequency of the commercial power supply is 60 Hz, the light emission period of the flicker is 8.33 ms, and hence, in this case, the number of accumulation time periods can be calculated as 8.33/1.66≈5, which means that it is possible to obtain the same photometric value every five accumulation time periods, as shown in FIG. 5. In short, the relationship of AE(n)=AE (n+5) holds.

On the other hand, under an environment where there is no flicker, AE(n) is constant irrespective of the value n. From the above, it is possible to define evaluation values F50 and F60 by the respective following equations (1) and (2):

$$F50 = \sum_{i=1}^{6} |AE(n) - AE(n+6)| \quad (1)$$

$$F60 = \sum_{i=1}^{6} |AE(n) - AE(n+5)| \quad (2)$$

and determine, using a threshold value Fth, whether or not there is flicker, and if there is flicker, it is possible to determine a frequency (i.e. light emission period) of the flicker.

More specifically, when F50<Fth and F60<Fth hold, it is possible to determine that it is under an environment where there is no flicker. When F50<Fth and F60≥Fth hold, it is possible to determine that it is under a flicker environment where the light emission period T=10 ms holds (i.e. the power frequency is 50 Hz). Further, when F50≥Fth and F60<Fth hold, it is possible to determine that it is under a flicker environment where the light emission period T=8.33 ms holds (i.e. the power frequency is 60 Hz).

Furthermore, it can be envisaged that there is a case where both F50 and F60 exceed Fth due to panning or shift of an object. In this case, the magnitude of F50 and that of F60 are compared with each other, and if F50 is smaller, it is determined that it is under the flicker environment where the light emission period T=10 ms holds (i.e. the power frequency is 50 Hz). On the other hand, if F60 is smaller, it is determined that it is under the flicker environment where the light emission period T=8.33 ms holds (i.e. the power frequency is 60 Hz).

That is, in the case of F50≥Fth and F60≥Fth, when F50≤F60 holds, it is determined that it is under the flicker environment where the light emission period T=10 ms holds (i.e. the power frequency is 50 Hz), and when F50>F60 holds, it is determined that it is under the flicker environment where the light emission period T=8.33 ms holds (i.e. the power frequency is 60 Hz). As described above, by calculating the evaluation values F50 and F60, it is possible to determine whether or not there is flicker, and if there is flicker, it is possible to determine whether the power frequency is 50 Hz or 60 Hz and further the light emission period T at the time. When there is flicker, a peak synchronization signal is generated. Basically, in this processing, twelve obtained photometric values are interpolated, whereby a time t(peak) is calculated at which the flicker is at its peak.

Figure 6A:
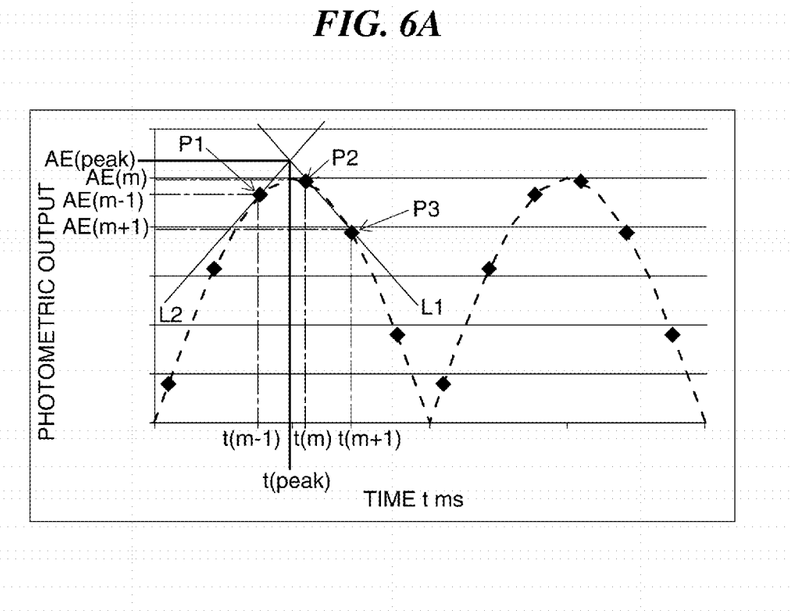
FIGS. 6A and 6B are graphs useful in explaining an example of a method of calculating peak timing of flicker.

FIG. 6A is a graph useful in explaining an example of a method of calculating peak timing of flicker.

Referring to FIG. 6A, a point where the largest output (photometric value) of photometric values AE(1) to AE(12) was obtained is represented by P2 (t(m), AE(m)). Then, an immediately preceding point before the point P2(t(m), AE(m)) at which a photometric value was obtained is represented by P1(t(m−1), AE(m−1)). Further, an immediately following point after the point P2(t(m), AE(m)) at which a photometric value was obtained is represented by P3 (t(m+1), AE(m+1)).

First, a straight line extending through a point having the smaller one of the photometric value AE(m−1) and the photometric value AE(m+1) (the point P3 in the example illustrated in FIG. 6A) and the point P2 is expressed by a linear equation: L1=at+b. Further, a straight line extending through a point having the larger one of the photometric value AE(m−1) and the photometric value AE(m+1) (the point P1 in the example illustrated in FIG. 6A) and having a slope "−a" is expressed by a linear equation L2. Then, by calculating a point of intersection between the straight lines L1 and L2, the peak timing t(peak) and a photometric value AE(peak) at the peak timing can be calculated.

Figure 6B:
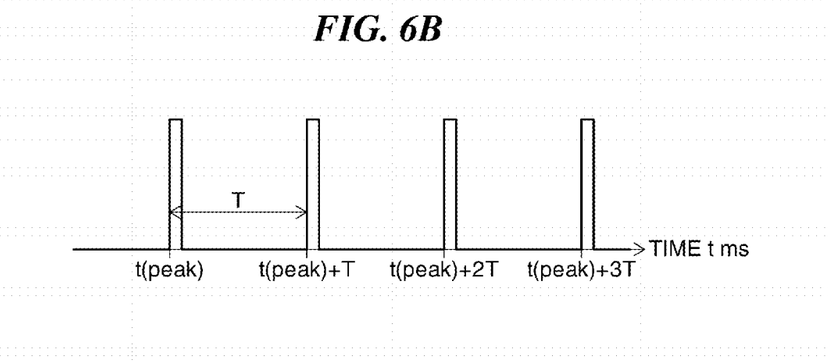

Furthermore, the light emission period T of the flicker has already been determined, and hence a peak synchronization signal that changes at each time (t=t(peak)+nT (n is a natural number)) is generated as shown in FIG. 6B. As described above, in the step S303, in a case where there is flicker, the ICPU 112 generates a light emission period thereof, a peak photometric value, and a peak synchronization signal, and the camera CPU 101 proceeds to a step S304.

Referring again to FIG. 3, in the step S304, AE and AF operations are performed prior to photographing. First, as for the AE operation, the ICPU 112 performs accumulation and readout using the AE sensor 108 and determines exposure conditions based on the obtained photometric values and a program diagram stored e.g. in the ROM of the memory 113. Further, as for the AF operation, the camera CPU 101 performs automatic focus detection by a phase difference detection method using the AF unit 110, and then the camera CPU 101 proceeds to a step S305 after completion of the AE and AF operations.

In the step S305, the camera CPU 101 determines whether or not flicker was detected in the step S303, and when flicker was detected, the process proceeds to a step S306, wherein the camera CPU 101 executes a continuous photographing sequence while taking a countermeasure against the flicker. On the other hand, when no flicker was detected in the step S303, the camera CPU 101 proceeds to a step S321 for execution of normal continuous photographing.

In the step S321, the camera CPU 101 awaits turn-on of the release switch SW2, and if the release switch SW2 is not turned on, the camera CPU 101 returns to the step S303, whereas if the release switch SW2 is turned on, the camera CPU 101 performs exposure in a step S322 under the exposure conditions determined by the AE operation performed in the step S304. Further, if the release switch SW2 is held on (YES to a step S323), the camera CPU 101 performs normal continuous photographing. More specifically, the camera CPU 101 repeatedly performs a photographing preparation operation (step S324) and a normal exposure operation (not synchronized with flicker peak timing) (step S325). Then, if it is determined in the step S323 that the release switch SW2 is turned off, the camera CPU 101 terminates the continuous photographing, i.e. the present photographing process is terminated. Hereafter, an exposure operation performed without synchronizing the exposure operation with flicker peak timing (exposure operation performed without considering timing at which the amount of light from an object satisfies predetermined conditions) will be referred to as "normal exposure (second exposure)" and an exposure operation performed by synchronizing the exposure operation with flicker peak timing (exposure operation performed while considering the timing at which the amount of light from the object satisfies the predetermined conditions) will be referred to as "peak synchronous exposure (first exposure)". Note that the exposure operation performed by synchronizing the exposure operation with flicker peak timing does not refer to an exposure operation performed such that peak timing and exposure start timing coincide with each other, but refers to an exposure operation performed by making the exposure operation synchronous with peak timing such that peak timing is included in an exposure period.

In the step S306, the camera CPU 101 evaluates shutter speed TV which is one of the exposure conditions determined in the step S304. Peak synchronous exposure aims to make exposure timing during photographing coincide with a flicker peak or its vicinity to thereby achieve exposure in a time range with little brightness variation. For this reason, insofar as the shutter speed TV is very short, peak synchronous exposure is effective. However, when the shutter speed TV is longer than a flicker period, i.e. a light emission period of flicker, brightness variation is leveled, and a photographed image is hardly affected by flicker. Therefore, a predetermined ratio α is stored in advance e.g. in the RAM of the memory 102, and a ratio between the shutter speed TV and the light emission period T of the flicker is evaluated.

More specifically, if TV/T>α is satisfied in the step S306, the camera CPU 101 judges that the shutter speed TV is sufficiently longer than the light emission period T and the influence of the flicker on a photographed image is sufficiently small, and proceeds to the step S321 which leads to the sequence for normal exposure. On the other hand, if TV/T≤α is satisfied, it is possible to obtain the effect of peak synchronous exposure, and hence the camera CPU 101 proceeds to a step S307.

Figure 7:
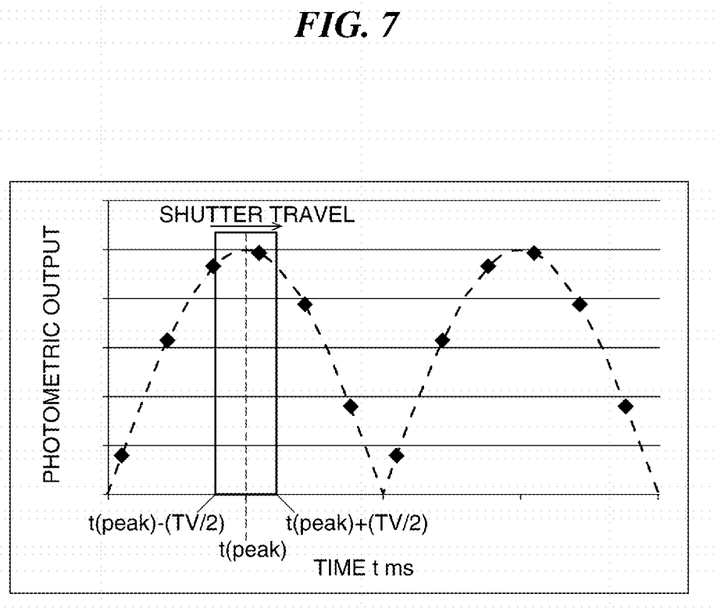
FIG. 7 is a graph useful in explaining shutter control performed in a case where peak synchronous exposure is performed based on a peak synchronization signal.

Then, in the step S307, the camera CPU 101 awaits turn-on of the release switch SW2, and if the release switch SW2 is not turned on, the camera CPU 101 returns to the step S303, whereas if the release switch SW2 is turned on, the camera CPU 101 performs peak synchronous exposure in a step S308 and then proceeds to a step S309. In the step S308, the camera CPU 101 performs peak synchronous exposure based on the peak synchronization signal generated in the step S303. Specifically, assuming that shutter speed is represented by TV, exposure is performed from a time t(peak)−TV/2 to a time t(peak)+TV/2 as shown in FIG. 7, and the exposure is controlled such that the center of the time period TV coincides with a time t(peak). This makes it possible to perform exposure in timing at which brightness variation is small.

If the release switch SW2 is off in the step S309, the camera CPU 101 terminates continuous photographing, whereas if the release switch SW2 is on in the step S309, the camera CPU 101 proceeds to a step S310 so as to perform continuous photographing of second and following frames.

In the step S310 to a step S312, the camera CPU 101 measures time taken for the photographing preparation operation. More specifically, the camera CPU 101 starts a timer incorporated in the camera CPU 101 itself in the step S310, performs a mirror-up/down operation and AE and AF processing in the step S311, and stops the timer in the step S312. With this, the camera CPU 101 measures time taken to perform the photographing preparation operation, and then proceeds to a step S313.

Similar to the step S306, in the step S313, if TV/T>α is satisfied, the camera CPU 101 judges that the shutter speed TV is sufficiently longer than the light emission period T and the influence of the flicker on a photographed image is sufficiently small, and proceeds to a step S320, wherein the sequence for normal exposure is executed. On the other hand, if TV/T≤α is satisfied, it is possible to obtain the effect of peak synchronous exposure, and hence the camera CPU 101 proceeds to a step S314.

In the step S314 to a step S316, the camera CPU 101 performs computation concerning time so as to determine whether or not it is possible to release the shutter in timing synchronous with the flicker peak timing while maintaining frame speed.

The computation will be described in detail also with reference to FIGS. 8A and 8B. First, in the step S314, the camera CPU 101 calculates an allowance time period (longest possible wait time period prior to exposure operation). In order to maintain frame speed, it is required to complete a photographing preparation operation and an exposure operation within a time period for single-frame photographing (frame period). Now, the frame period is represented by C [ms], a time period required for a photographing preparation operation, which was measured in the step S312, by P [ms], and the shutter speed determined by the AE operation in the step S311 by TV [ms], and the starting point of the time t is set to timing of the start of exposure preparation.

Further, it is assumed that in exposure performed in synchronism with the flicker peak, the center of an exposure time period comes to peak timing. In this case, if flicker peak timing occurs within a time period of C−P−TV [ms] between a time P+TV/2 and a time C−TV/2 (first time period) as shown in FIG. 8A, it is possible to perform peak synchronous exposure without reducing frame speed, and therefore this time period corresponds to the allowance time period. That is, the first time period is set based on a continuous photographing speed and timing at which an exposure instruction is given. As for the flicker peak timing, the peak synchronization signal is generated in advance in the step S303, and hence in a step S315, the camera CPU 101 calculates a next flicker peak occurrence time (flicker peak timing). This makes it possible to determine in a step S316 whether a next peak of the flicker occurs within the allowance time period. In the example shown in FIG. 8A, an exposure operation can be performed within the allowance time period in a manner synchronized with flicker peak timing t=X [ms].

Figure 8A:
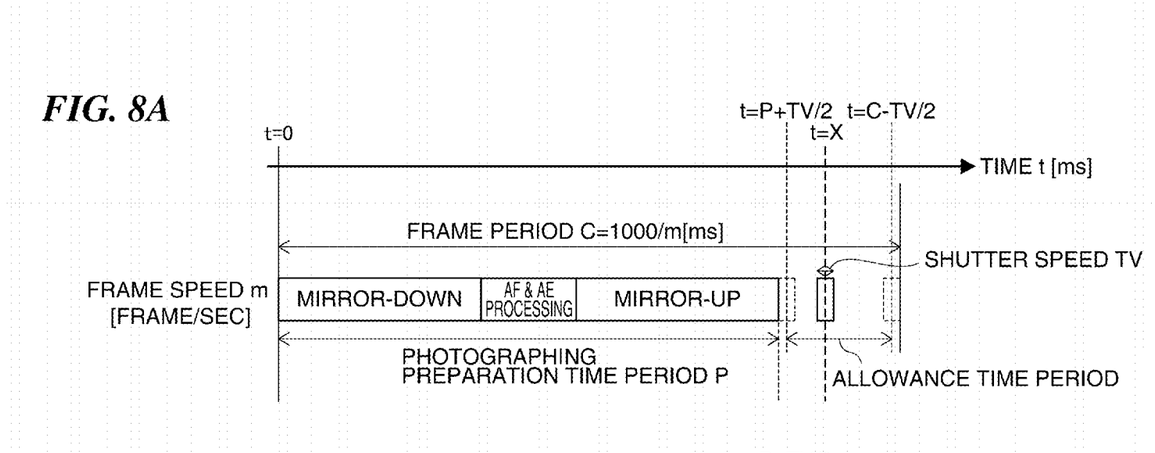
FIGS. 8A and 8B are graphs useful in explaining the relationship between flicker and exposure timing.
Figure 8B:
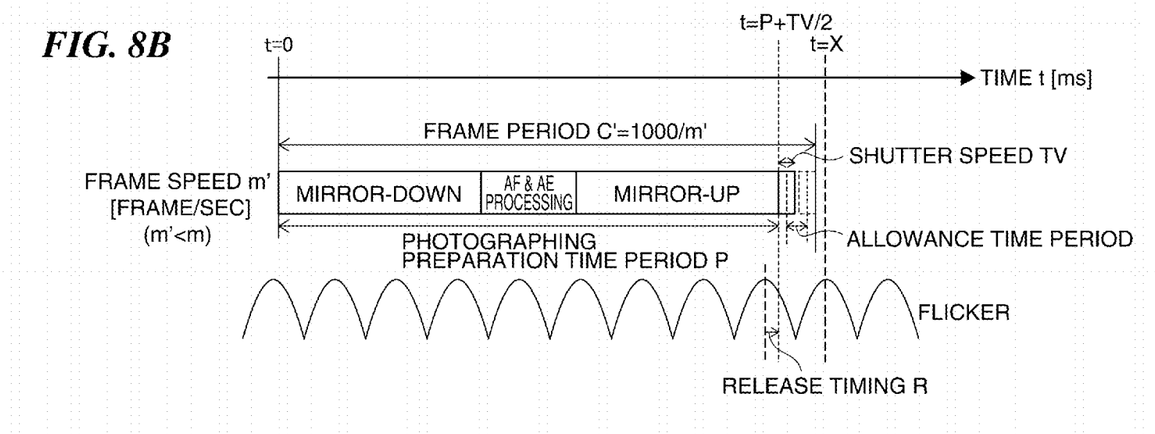

On the other hand, FIG. 8B is a graph showing an example of a case where the frame speed is higher than in the case shown in FIG. 8A. In the FIG. 8B case, a frame period C' is shorter than the frame period C. For this reason, even if the shutter speed TV and the time P required for a photographing preparation operation are the same as those in FIG. 8A, the allowance time period is shorter, and hence flicker peak timing does not occur within the allowance time period. Therefore, it is impossible to perform peak synchronous exposure unless the frame speed is reduced.

If it is determined in the step S316 that it is possible to perform exposure in timing synchronous with the peak of the flicker without reducing the frame speed, the camera CPU 101 proceeds to a step S317, wherein the camera CPU 101 performs the peak synchronous exposure. Otherwise, the camera CPU 101 proceeds to a step S318.

In the step S318, the camera CPU 101 performs normal exposure. However a photographed image obtained by this exposure is affected by the flicker, and hence the camera CPU 101 performs processing for storing timing of the normal exposure performed during light and dark variation caused by the flicker, in preparation for luminance correction of the photographed image, which is to be performed by image processing afterwards.

In the FIG. 8B example, it is assumed that peak synchronous exposure cannot be performed, and actual exposure is started immediately after the lapse of the time required for the photographing preparation operation. In this case, the camera CPU 101 stores a time period R [ms] from a time point when a flicker peak was detected last time to a time point when the actual exposure is started, e.g. in the RAM of the memory 102, and proceeds to a step S319 after termination of the normal exposure.

In the step S319, the camera CPU 101 performs the image processing to thereby correct the image affected by the flicker. In the present embodiment, in actual shutter travel, front and rear curtains of the focal plane shutter 104 travel vertically across a screen from top to bottom, such that there is a time lag in travelling between the front and rear curtains so as to form a slit. Consequently, exposure timing differs between an upper portion of the screen and a lower portion of the same, which causes generation of horizontal stripes under a flicker environment. However, since results of photometry of the light and dark variation of the flicker actually performed at time intervals of 1.66 ms in the step S303 (photometric values) were stored and the timing in which the normal exposure was performed was also acquired as R in the step S318, it is possible to numerically calculate the horizontal stripes that appear on the screen.

Figure 9:
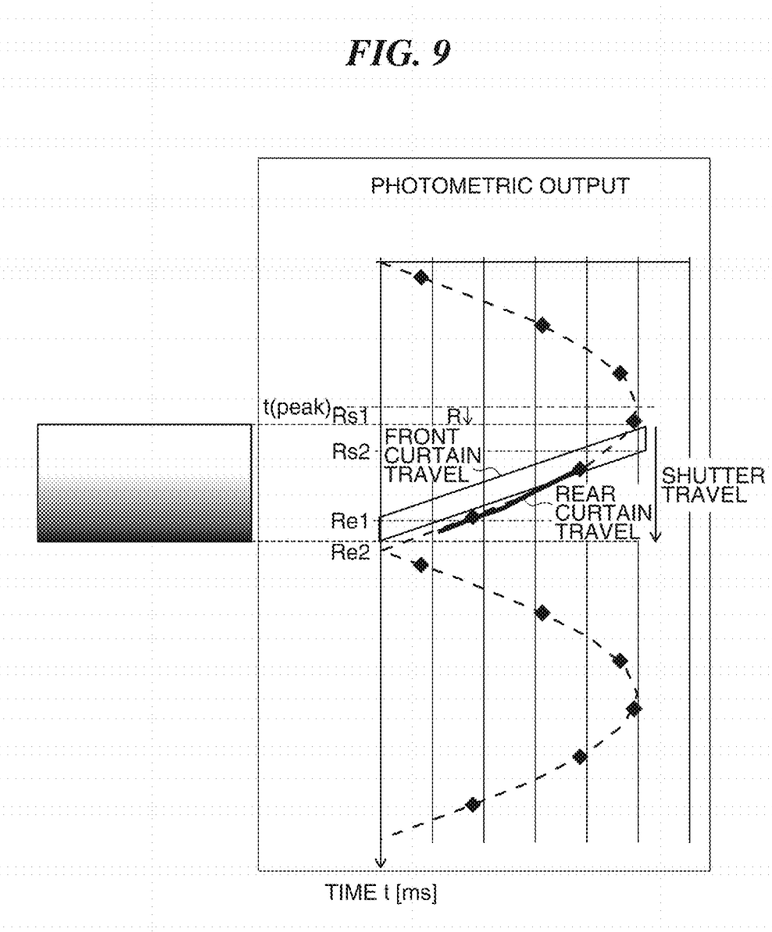
FIG. 9 is a graph useful in explaining horizontal stripes appearing in an obtained image due to flicker.

The calculation will be described in detail with reference to FIG. 9. FIG. 9 is a graph showing the results of photometry performed twelve times for flicker detection, which are obtained in the step S303. Referring to FIG. 9, the shutter starts traveling at a time point which is the time period R [ms] later than a flicker peak, and hence, for example, an uppermost line on the screen has a brightness obtained by integrating photometric values over a time period between times Rs1 and Rs2, and a lowermost line on the screen has a brightness obtained by integrating photometric values over a time period between times Re1 and Re2.

Therefore, in the FIG. 9 example, an image is obtained in which an upper portion thereof is relatively bright and the brightness is progressively reduced toward a lower portion thereof. From the above, by interpolating the results of photometry performed twelve times, which were obtained in the step S303, using a function (e.g. |Sin(t)|), and integrating the photometric values in a time section corresponding to shutter travel timing on a line-by-line basis from the upper portion of the screen to the lower portion thereof, it is possible to obtain a brightness in each position on the screen in the vertical direction. Therefore, by calculating a ratio of each line-specific brightness e.g. to the brightness of a brightest line, and then multiplying the signal value of each line by a correction value obtained as the reciprocal of an associated one of the calculated ratios, it is possible to obtain an image with the influence of a flicker minimized.

After the peak synchronous exposure in the step S317, the correction in the step S319, or the normal exposure in the step S320 is finished, the camera CPU 101 returns to the step S309 and executes a sequence associated with a next frame.

As described heretofore, according to the present embodiment, during continuous photographing, when the shutter release time lag can be allowed, peak synchronous exposure is performed, whereas when the shutter release time lag cannot be allowed, normal exposure is performed and then an image having luminance variation caused by flicker is corrected by image processing. This makes it possible to obtain a high-quality image with reduced influence of the flicker, while suppressing reduction of the frame speed.

Although in the above-described embodiment, switching between peak synchronous exposure and normal exposure is performed in the steps S314 to S316, according to whether or not a flicker peak occurs within an allowance time period, this is not limitative. For example, a method may be employed in which when a specified frame speed is not higher than a predetermined speed, the exposure is switched to the peak synchronous exposure, whereas when the specified frame speed is higher than the predetermined speed, the exposure is switched to the normal exposure. In this case, it is only required that the predetermined speed is set according to the length of the photographing preparation time period such that the specified frame speed can be maintained, and the predetermined speed may be set e.g. to seven frames per second.

Further, although in the above-described embodiment, exposure timing in peak synchronous exposure is set with reference to flicker peak timing, this is not limitative, but if the change in the amount of light in flicker moderately turns from decrease to increase, the exposure timing may be set with reference to bottom timing. In other words, the exposure timing can be set with reference to timing in which the change in the amount of light in flicker assumes an extreme value.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2014-152910 filed Jul. 28, 2014 which is hereby incorporated by reference herein in its entirety.

What is claimed is:

1. An image pickup apparatus capable of performing continuous photographing with a specified frame speed, comprising:
    an image pickup device;
    an exposure unit configured to perform exposure of said image pickup device in response to a photographing instruction;
    a detection unit configured to detect peak timing of flicker;
    a switching unit configured to switch between first exposure in which said exposure unit performs an exposure operation by making the exposure operation synchronous with the peak timing of flicker detected by said detection unit and second exposure in which said exposure unit performs an exposure operation without making the exposure operation synchronous with the peak timing of flicker detected by said detection unit; and
    a correction unit configured to correct a photographed image obtained by the second exposure,
    wherein said switching unit switches between the first exposure and the second exposure, based on the peak timing of flicker detected by said detection unit.

2. The image pickup apparatus according to claim 1, wherein in continuous photographing, when a peak of the flicker is to occur within a time period corresponding to one frame and during an exposure wait time period before the exposure which enables the specified frame speed to be maintained, said switching unit switches to the first exposure, whereas when the peak of the flicker is not to occur during the exposure wait time period which enables the specified frame speed to be maintained, said switching unit switches to the second exposure.

3. An image pickup apparatus capable of performing continuous photographing with a specified frame speed, comprising:
    an image pickup device;
    an exposure unit configured to perform exposure of said image pickup device in response to a photographing instruction;
    a detection unit configured to detect peak timing of flicker;
    a switching unit configured to switch between first exposure in which said exposure unit performs an exposure operation by making the exposure operation synchronous with the peak timing of flicker detected by said detection unit and second exposure in which said exposure unit performs an exposure operation without making the exposure operation synchronous with the peak timing of flicker detected by said detection unit; and
    a correction unit configured to correct a photographed image obtained by the second exposure,
    wherein said switching unit switches to the first exposure in a case where the specified frame speed is not higher than a predetermined speed, and switches to the second exposure in a case where the specified frame speed is higher than the predetermined speed.

4. An image pickup apparatus comprising:
an image pickup device;
a calculation unit configured to calculate a light amount change characteristic of light from an object;
a control unit configured to control exposure of the image pickup device; and
a correction unit configured to perform brightness correction on image data obtained by causing exposure of said image pickup device,
wherein said control unit switches, based on the light amount change characteristic calculated by said calculation unit, between first exposure control in which the exposure of said image pickup device is caused while considering timing at which the amount of light from the object satisfies predetermined conditions, and second exposure control in which the exposure of said image pickup device is caused without considering the timing at which the amount of light from the object satisfies the predetermined conditions, and
wherein said correction unit performs the brightness correction on image data obtained by said control unit performing the second exposure control and causing the exposure of said image pickup device.

5. The image pickup apparatus according to claim 4, wherein said control unit switches between the first exposure control and the second exposure control, based on the timing at which the amount of light from the object satisfies the predetermined conditions.

6. The image pickup apparatus according to claim 5, wherein said control unit performs the first exposure control in a case where the timing at which the amount of light from the object satisfies the predetermined conditions is included in a first time period, and performs the second exposure control in a case where the timing at which the amount of light from the object satisfies the predetermined conditions is not included in the first time period.

7. The image pickup apparatus according to claim 6, wherein the image pickup apparatus is capable of performing continuous photographing, and
wherein in a case where the image pickup apparatus performs continuous photographing, the first time period is set based on a continuous photographing speed.

8. The image pickup apparatus according to claim 6, wherein the image pickup apparatus is capable of performing continuous photographing, and
wherein in a case where the image pickup apparatus performs continuous photographing, the first time period is determined based on a continuous photographing speed, an exposure time period of said image pickup device, and a second time period for performing a photographing preparation operation.

9. The image pickup apparatus according to claim 6, wherein the first time period is set based on timing at which an exposure instruction is given.

10. The image pickup apparatus according to claim 4, wherein said correction unit performs, based on the light amount change characteristic calculated by said calculation unit, brightness correction on image data obtained by said control unit performing the second exposure control and causing the exposure of said image pickup device.

11. The image pickup apparatus according to claim 4, wherein the timing at which the amount of light from the object satisfies the predetermined conditions is a timing at which the amount of light from the object becomes largest in a periodical change in the amount of light from the object.

12. A method of controlling an image pickup apparatus including an image pickup device and an exposure unit configured to perform exposure of the image pickup device in response to a photographing instruction, the image pickup apparatus being capable of performing continuous photographing with a specified frame speed, comprising:
detecting peak timing of flicker;
switching between first exposure in which the exposure unit performs an exposure operation by making the exposure operation synchronous with the peak timing of flicker detected by said detecting and second exposure in which the exposure unit performs an exposure operation without making the exposure operation synchronous with the peak timing of flicker detected by said detecting;
correcting a photographed image obtained by the second exposure; and
switching between the first exposure and the second exposure, based on the peak timing of flicker detected by said detecting.

13. A method of controlling an image pickup apparatus including an image pickup device and an exposure unit configured to perform exposure of the image pickup device in response to a photographing instruction, the image pickup apparatus being capable of performing continuous photographing with a specified frame speed, comprising:
detecting peak timing of flicker;
switching between first exposure in which the exposure unit performs an exposure operation by making the exposure operation synchronous with the peak timing of flicker detected by said detecting and second exposure in which the exposure unit performs an exposure operation without making the exposure operation synchronous with the peak timing of flicker detected by said detecting;
correcting a photographed image obtained by the second exposure; and
switching to the first exposure in a case where the specified frame speed is not higher than a predetermined speed, and switching to the second exposure in a case where the specified frame speed is higher than the predetermined speed.

14. A method of controlling an image pickup apparatus, comprising:
calculating a light amount change characteristic of light from an object;
controlling exposure of an image pickup device;
performing brightness correction on image data obtained by causing exposure of the image pickup device;
switching, based on the calculated light amount change characteristic, between first exposure control in which the exposure of the image pickup device is caused while considering timing at which the amount of light from the object satisfies predetermined conditions, and second exposure control in which the exposure of the image pickup device is caused without considering the timing at which the amount of light from the object satisfies the predetermined conditions; and
performing the brightness correction on image data obtained by performing the second exposure control and causing the exposure of the image pickup device.

* * * * *